US012625537B2

(12) United States Patent
Sundaram et al.

(10) Patent No.: US 12,625,537 B2
(45) Date of Patent: May 12, 2026

(54) USB-C WIRELESS WIDE AREA NETWORK DONGLE

(71) Applicant: Intel Corporation, Santa Clara, CA (US)

(72) Inventors: Arvind Sundaram, Bangalore (IN); Santhosh Ap, Bangalore (IN); Shailendra Singh Chauhan, Bengaluru (IN); Nagalakshmi Shashidhara Guptha, Bangalore (IN); Nirmala Bailur, Bangalore (IN); Mythili Hegde, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/702,270

(22) Filed: Mar. 23, 2022

(65) Prior Publication Data

US 2023/0324981 A1 Oct. 12, 2023

(51) Int. Cl.
| | |
|---|---|
| *G06F 1/3206* | (2019.01) |
| *G06F 1/26* | (2006.01) |
| *G06F 1/3234* | (2019.01) |
| *G06F 1/3296* | (2019.01) |
| *G06F 9/4401* | (2018.01) |
| *G06F 13/42* | (2006.01) |

(52) U.S. Cl.
CPC ............ *G06F 1/3206* (2013.01); *G06F 1/266* (2013.01); *G06F 1/3278* (2013.01); *G06F 1/3296* (2013.01); *G06F 9/4411* (2013.01); *G06F 13/4282* (2013.01); *G06F 2213/0042* (2013.01)

(58) Field of Classification Search
CPC ...... G06F 1/3206; G06F 1/325; G06F 1/3278; G06F 1/3296; G06F 9/4411; G06F 13/4027; G06F 13/4045; G06F 13/4063; G06F 13/4068; G06F 13/4282; G06F 1/26; G06F 1/266
See application file for complete search history.

(56) References Cited

U.S. PATENT DOCUMENTS

| | | | | |
|---|---|---|---|---|
| 10,346,335 B1 * | 7/2019 | Vu | ......................... | G06F 13/385 |
| 2009/0006675 A1 * | 1/2009 | Rofougaran | ......... | H05K 5/0278 |
| | | | | 710/62 |

(Continued)

OTHER PUBLICATIONS

"Universal Serial Bus Power Delivery Specification". Revision 1.0. Hewlett-Packard Company, et al. Jul. 5, 2012. (Year: 2012).*

(Continued)

*Primary Examiner* — Thomas J. Cleary
(74) *Attorney, Agent, or Firm* — Schwegman Lundberg & Woessner, P.A.

(57) ABSTRACT

An apparatus can include Universal Serial Bus Type C (USB-C) connection circuitry. The apparatus can also include input/output (I/O) circuitry coupled to the USB-C connection circuitry. The I/O circuitry can receive a power signal over the USB-C connection circuitry. The apparatus can include baseband circuitry to initiate wireless wide area network (WWAN) communication responsive to receiving a wake signal from the I/O circuitry. The WWAN communication can include messages received from the USB-C connection circuitry. Other apparatuses, systems, and methods are described.

17 Claims, 11 Drawing Sheets

(56) References Cited

U.S. PATENT DOCUMENTS

| | | | | |
|---|---|---|---|---|
| 2011/0188552 A1* | 8/2011 | Yoon | ..................... | H01Q 21/28 |
| | | | | 375/267 |
| 2011/0270952 A1* | 11/2011 | Ray | ........................ | H04L 12/10 |
| | | | | 709/217 |
| 2012/0096299 A1* | 4/2012 | Kim | ..................... | G06F 1/3278 |
| | | | | 713/340 |
| 2014/0189409 A1* | 7/2014 | Jeyaseelan | .............. | G06F 13/20 |
| | | | | 713/324 |
| 2017/0124016 A1* | 5/2017 | Gerber | ................ | G06F 13/4068 |
| 2018/0189223 A1* | 7/2018 | Nge | ...................... | G06F 1/3287 |
| 2019/0089258 A1* | 3/2019 | Giuliano | ................ | H02M 3/07 |
| 2020/0272404 A1* | 8/2020 | Mu | ........................ | G06F 3/1454 |
| 2021/0144335 A1* | 5/2021 | Pang | ...................... | G06F 1/263 |
| 2022/0129398 A1* | 4/2022 | Benjamini | ............. | G06F 13/20 |
| 2022/0179814 A1* | 6/2022 | Mishra | ................. | G06F 13/385 |

OTHER PUBLICATIONS

"Universal Serial Bus Power Delivery Specification". Revision 3.0. Version 2.0+ECNs. Feb. 7, 2020. USB 3.0 Promoter Group. (Year: 2020).*

"Predator Connect D5 5G Dongle", [Online]. Retrieved from the Internet: URL: https: www.acer.com ac en IN content predator-model FF.G16TA.001, (Accessed on Mar. 10, 2022), 5 pgs.

* cited by examiner

502 Detect a connection signal

504 Detect whether the connection signal is received from a WWAN device

506 Provide I2C signals or side band use (SBU) signals

600

602 Detect a connection event

604 Receive a wake signal

606 Initiate WWAN communication responsive to receiving the wake signal

USB-C WIRELESS WIDE AREA NETWORK DONGLE

TECHNICAL FIELD

Aspects of the disclosure pertain to computer hardware devices for performing wireless communications. More particularly, aspects relate to dongles for connecting to a computing device to perform wireless wide area network (WWAN) communications.

BACKGROUND

Computer manufacturers have been slow to adopt integrated wireless wide area network (WWAN) solutions due to cost and power concerns. Instead, it is more common to find a WWAN modem integrated into a PC as a Universal Serial Bus Type A (USB-A) dongle. However, USB-A-based solutions are limited by a lack of power device negotiation capability. Furthermore, it has become increasingly common for computer systems to use Type C USB (USB-C) connectors, and therefore, USB-A dongles are becoming less useful.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which:

FIG. 3 illustrates a signal diagram for USBC WWAN device identification with a PD controller according to some aspects.

DETAILED DESCRIPTION

Figure 1A:
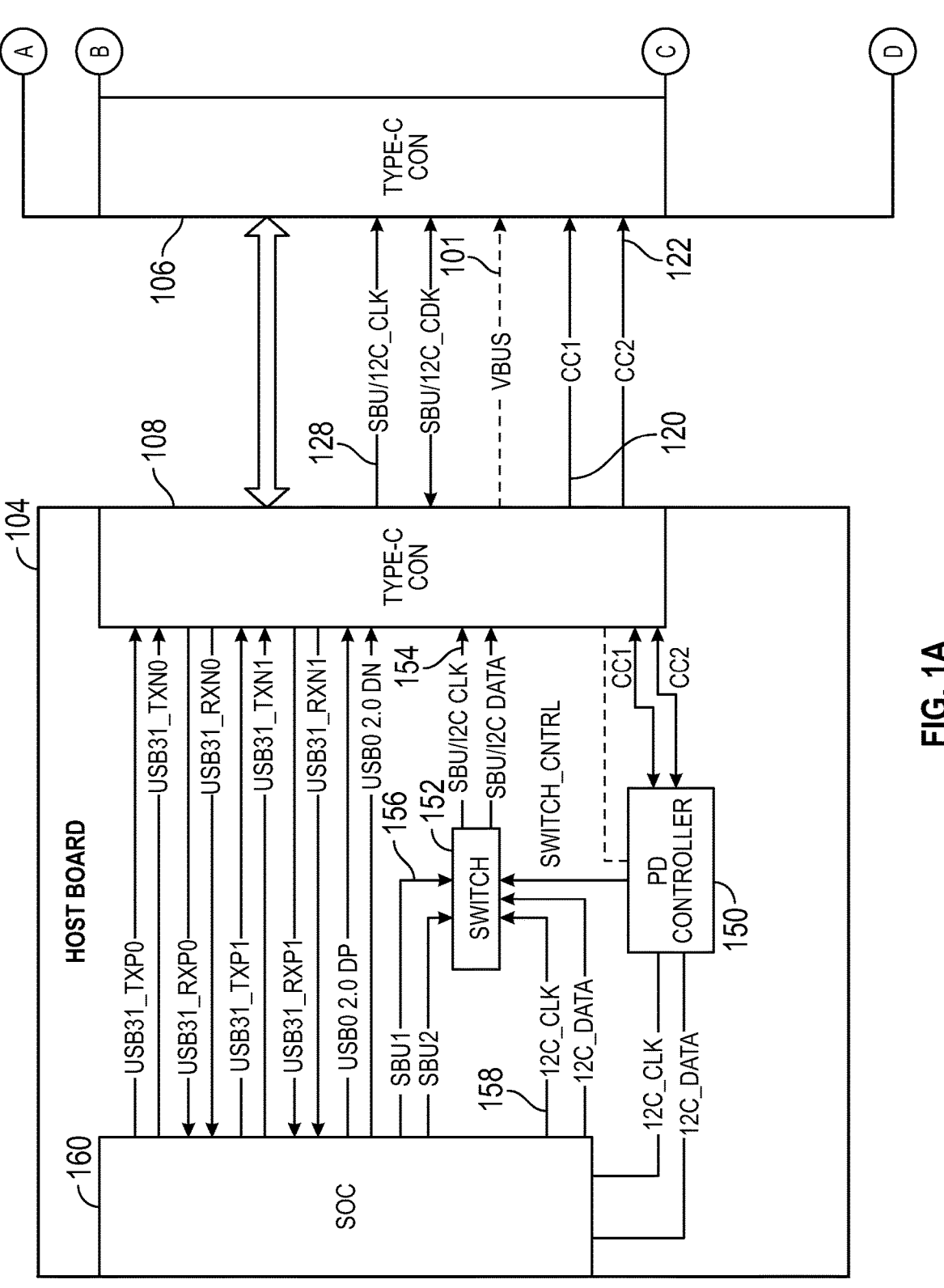
FIGS. 1A and 1B illustrate an exemplary USB-C WWAN apparatus (e.g., "dongle") with a power device (PD) controller according to some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Wireless technology advancements (e.g., 5G and millimeter-wave technology) have led to improved performance in terms of latency reduction and increase in bandwidth. Client PC users have therefore shown an interest in using wireless wide area network (WWAN) technology with their devices to take advantage of these advancements. However, manufacturers of client PC systems have been slow to integrate WWAN due to the high cost of WWAN modules. Some manufacturers have attempted to integrate WWAN modems using USB dongles. However, the power usage of such dongles has increased to as high as 15 watts or even more with usage of 5G and mmWave communications. Traditional type-A USB based solutions seems to be limiting the solution space due to lack of power device (PD) negotiation capability. Furthermore, USB-C has become the connection of choice in most PC systems today and therefore USB-A is becoming less commonly-used. In summary, therefore, there is a need to support 5G, mmWave modem features on USB-C interfaces.

In general, WWAN can integrate into client PC systems either through modem down solutions in the PC mother board or as an M.2 module in the client PC system, or as a USB plug and play module. When WWAN is integrated into the client PC system as an M.2 module, the height of the PC is increased, and this therefore is a less desirable solution. On the other hand, soldered WWAN solutions can provide thinner and lighter PCs, but are very costly and furthermore provide an always-on solution that may not be desired by customers.

Aspects of the disclosure address these and other concerns by providing a USB-C WWAN device, referred to hereinafter as a "dongle." A dongle comprises a piece of computer hardware that connects to a port of another device to enable additional functionality on that device. In the context of aspects described herein, a dongle can comprise a device that connects into a laptop USB-C port or other computer device USB-C port to provide WWAN functionality to that laptop or other computing device. USB-C WWAN dongles as provided in aspects of the disclosure can provide advantages of 5G connectivity during travel time or mobility time with a laptop or other computing device.

Further, the cost of client PC system with WWAN can be reduced by providing a pay-as-you-go approach through use of the dongle. Power usage can be reduced, and heat concerns can be reduced by moving high-heat devices outside of the laptop casing into the external dongle. A greater number of M.2 features can be leveraged by using the dongle provided in apparatuses according to aspects. Some M.2 features can include Wake on WWAN, service aggregation router (SAR) functions, and module power control. Furthermore, the dongle provided according to aspects helps reduce the IO level translator interface used between a system-on-chip (SOC) and WWAN module. For example, available systems can use an I/O level translator interface between a 1.8V SOC and 3.3V WWAN module, and the need for this interface is removed when dongles are used according to example aspects.

Figure 1B:
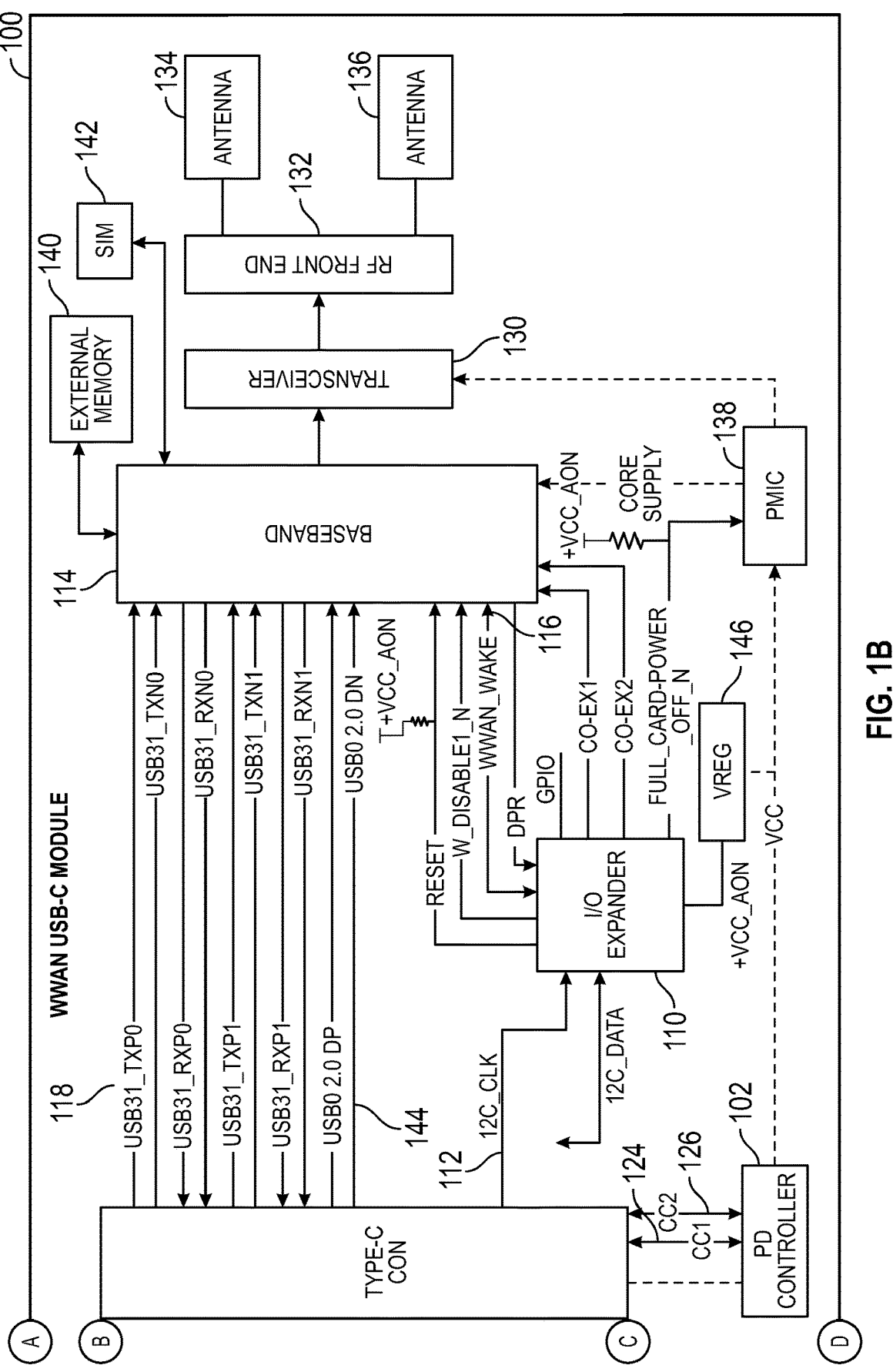

FIGS. 1A and 1B illustrate an exemplary USB-C WWAN apparatus (e.g., dongle) 100 with a power device (PD) controller 102 according to some aspects. The apparatus 100 can connect to a host board 104 of a client PC system. USB-C connection circuitry 106 on the apparatus 100 connects to corresponding USB-C connection circuitry 108 on the host board 104 of the client PC system.

The USB-C connection circuitry 106 and USB-C connection circuitry 108 can include the following pin mappings, usage of which will be discussed with respect to aspects later herein.

TABLE 1

| Host side and device side USB-C pin mapping. | | |
| --- | --- | --- |
| Pin Number | Pin Name Host Side | Pin Name Device Side |
| A1 | GND_A1 | GND_A1 |
| A2 | TX1_P | TX1_P |
| A3 | TX1_M | TX1_M |
| A4 | VBUS_A1 | VBUS_A1 |
| A5 | CC1 | CC1 |
| A6 | D_P_A | D_P_A |
| A7 | D_N_A | D_N_A |
| A8 | SBU1 | SCL |
| A9 | VBUS_A2 | VBUS_A2 |
| A10 | RX2_M | RX2_M |
| A11 | RX2_P | RX2_P |
| A12 | GND_A2 | GND_A2 |
| B1 | GND_B1 | GND_B1 |
| B2 | TX2_P | TX2_P |
| B3 | TX2_M | TX2_M |
| B4 | VBUS_B1 | VBUS_B1 |
| B5 | CC2 | CC2 |
| B6 | D_P_B | D_P_B |
| B7 | D_N_B | D_N_B |
| B8 | SBU2 | SDA |
| B9 | VBUS_B2 | VBUS_B2 |
| B10 | RX1_M | RX1_M |
| B11 | RX1_P | RX1_P |
| B12 | GND_B2 | GND_B2 |

The apparatus 100 can further comprise input/output (I/O) circuitry 110 coupled to the USB-C connection circuitry 106. The I/O circuitry 110 can receive a power signal 112 over the USB-C connection circuitry 106. In some examples, a power level of 900 milliamperes (mA), 1.5 amperes (A), 3 A or 5 A is provided to the I/O circuitry, although these are only examples and other power levels can be provided. The apparatus 100 can further include baseband circuitry 114 coupled to the USB-C connection circuitry 106 and to the I/O circuitry 110 and configured to initiate wireless wide area network (WWAN) communication responsive to receiving a wake signal 116 from the I/O circuitry 110. The WWAN communication can include messages received over USB transmit (TX) and receive (RX) data lines 118 received from the USB-C connection circuitry 106. The USB TX and RX data lines 118 are used by the apparatus 100 to carry WWAN traffic. The USB2 lines 144 are used for debug and flashing purposes very similar to M.2 designs.

In some aspects, the I/O circuitry 110 can perform power negotiations responsive to a connection signal received at source-to-sink connector pins 120, 122 of the apparatus 100. In some examples, side band use (SBU) pins 128 of the USB-C connection circuitry 106 can perform I2C operations, wherein the I2C operations include configuring the I/O circuitry 110 to support M.2 features.

The PD controller 102 can receive signals 124, 126 from the USB-C connection circuitry 106 corresponded to those received at pins 120, 122. The PD controller 102 can request power profile information responsive to receiving a power capabilities advertisement signal over the USB-C connection circuitry 106, as will be described in more detail with reference to FIG. 3 later herein.

Baseband circuitry 114 can contain one or more digital baseband subsystems. In an aspect, the one or more digital baseband subsystems may be coupled to one or more of each of a digital baseband interface and mixed-signal baseband subsystem. In some aspects, baseband circuitry 114 may be implemented, for example, as a solder-down substrate including one or more integrated circuits, a single packaged integrated circuit soldered to a main circuit board, and/or a multi-chip module including two or more integrated circuits.

The apparatus 100 can comprise other circuitry for performing wireless communications, including transceiver circuitry 130, radio front end (RFE) 132, and one or more antenna/s 134, 136. The RFE 132 can be a small circuit board including a number of printed antennas 134, 136 or other antennas, and one or more RF devices containing multiple radio chains, including upconversion/downconversion to millimeter wave frequencies, power combiner/dividers, programmable phase shifting and power amplifiers (PA), low noise amplifiers (LNA), as well as control and power management circuitry. The apparatus 100 can further include power management integrated circuit (PMIC) 138, memory 140, and subscriber identity module (SIM) 142. Antennas 134, 136 can also include surface mounted device (SMD) chip antennas considering the space available in the apparatus 100.

The host board 104 can include a switch (e.g., a dual pole four-throw (DP4T) switch) 152, which can connect the SBU pins 154 on the USB-C connection circuitry 108 to either SBU signals 156 or I2C signal 158 on the system on chip (SOC) 160 depending on the type of module connected to the USB-C connection circuitry 108.

Figure 2A:
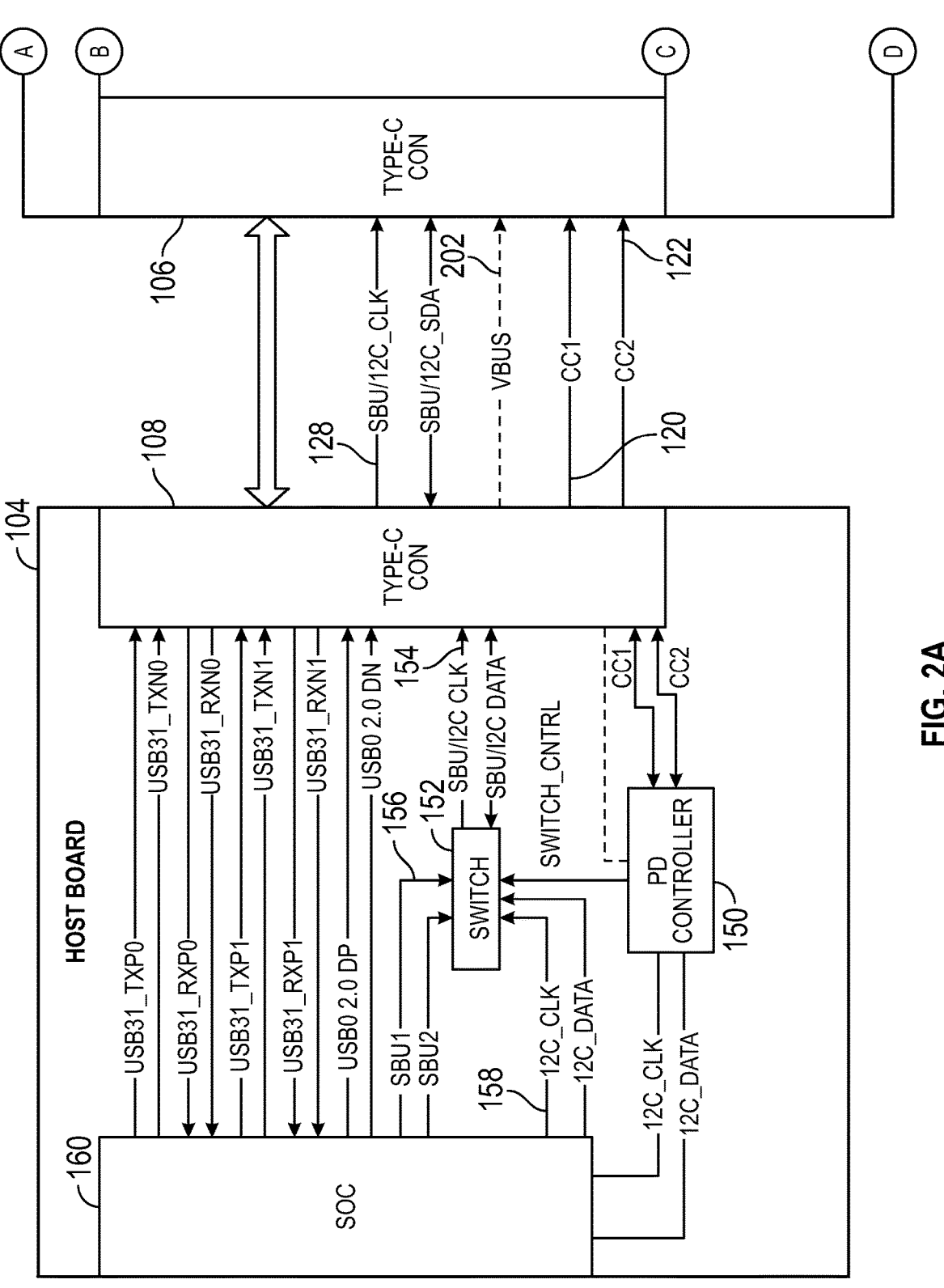
FIGS. 2A and 2B illustrate an exemplary USB-C WWAN apparatus (e.g., "dongle") without a PD controller according to some aspects.
Figure 2B:
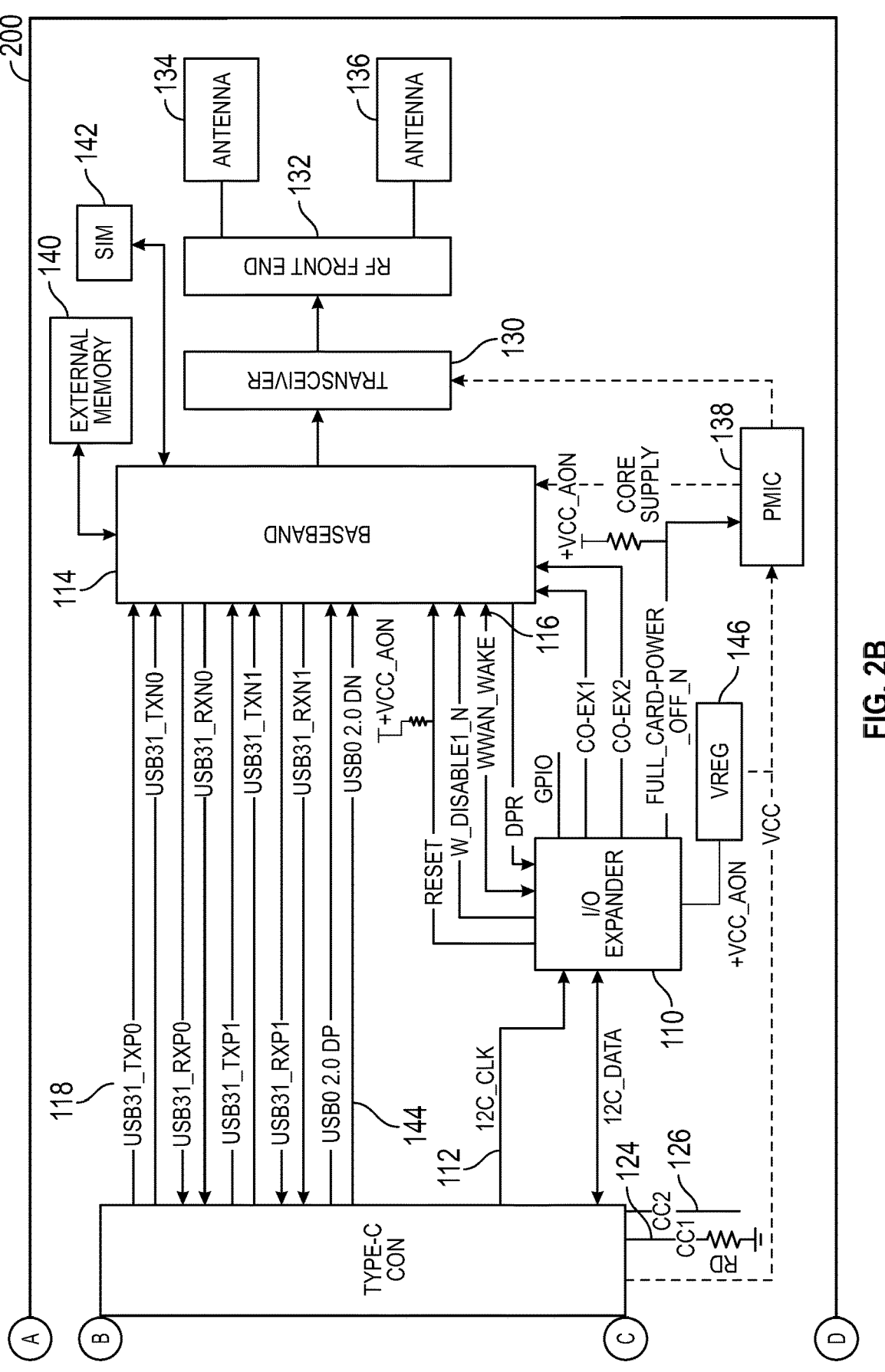

FIGS. 2A and 2B illustrate an exemplary USB-C WWAN apparatus (e.g., dongle) 200 without a PD controller according to some aspects. The apparatus 200 includes some similar features as apparatus 100, and similar structures are provided with similar reference numerals as FIGS. 1A and 1B where appropriate, and only differences with the apparatus 100 are described with reference to FIGS. 2A and 2B.

In apparatus 200, power negotiations are not performed using a PD controller. Instead, a default USB power of 900 mA or 1.5 A to 3 A will be provided depending on source side capability-Rp pull up value as described with reference to FIG. 4 later herein. Signals 124, 126 from the USB-C connection circuitry 106 corresponded to those received at pins 120, 122 and are provided to a pulldown resistor or to ground, respectively.

In either apparatus 100 (FIGS. 1A and 1B) and apparatus 200 (FIGS. 2A and 2B) when the apparatus 100, 200 is provided power at VBUS 101 (FIGS. 1A and 1B) or VBUS 202 (FIGS. 2A and 2B), the apparatus 100, 200 will power on the I/O circuitry 110 and the default configuration pull up (FCPO, reset) by a small voltage regulator 146 to power on the PMIC 138. This will cause the baseband circuitry 114 to boot. Subsequent to boot of baseband circuitry 114, device detection and enumeration will occur according to standards of the USB family of standards. The SBU lines 128 will not be used subsequently for WWAN communications and can instead be repurposed to act as a I2C lines to configure the I/O circuitry 110 and used in the apparatus 100, 200 to enable supported M.2 features.

Figure 3:
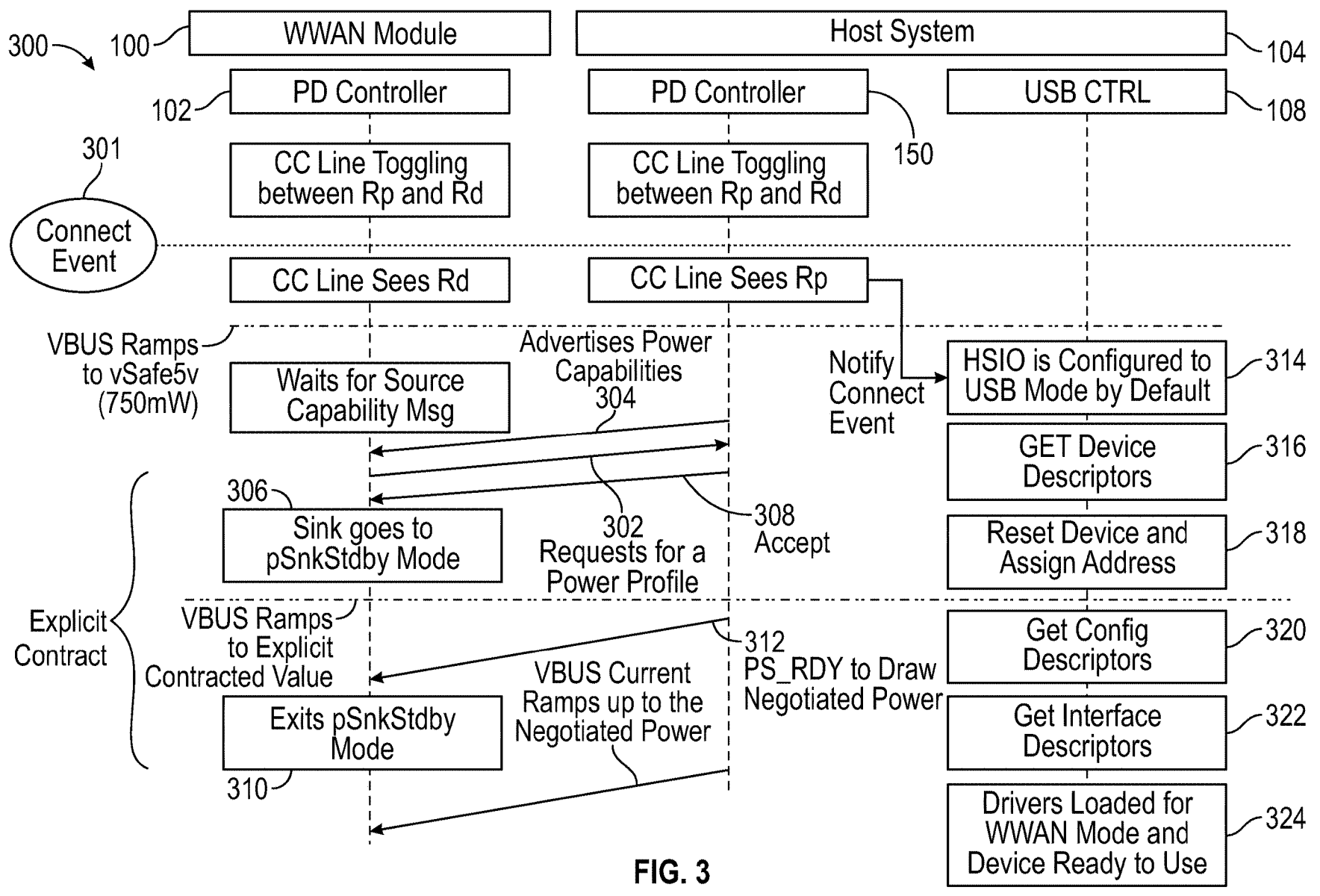

FIG. 3 illustrates a signal diagram 300 for USBC WWAN device identification with a PD controller 102 according to some aspects. As briefly mentioned earlier herein with respect to FIGS. 1A and 1B, the PD controller 102 can request power profile information at signal 302 responsive to receiving a power capabilities advertisement signal 304 over the USB-C connection circuitry 106. The PD controller 102 can control the apparatus 100 to enter a standby mode at block 306 responsive to receiving the requested power profile information at signal 308, and to exit the standby mode at block 310 responsive to sensing a negotiated power level at the USB-C connection circuitry at signal 312. A connect event 301 can also configure the USB connection circuitry 108 of the host board 104 to configure a USB mode according to a standard of the USB family of standards, in blocks 314, 316, 318, 320, 322, and 324.

Figure 4:
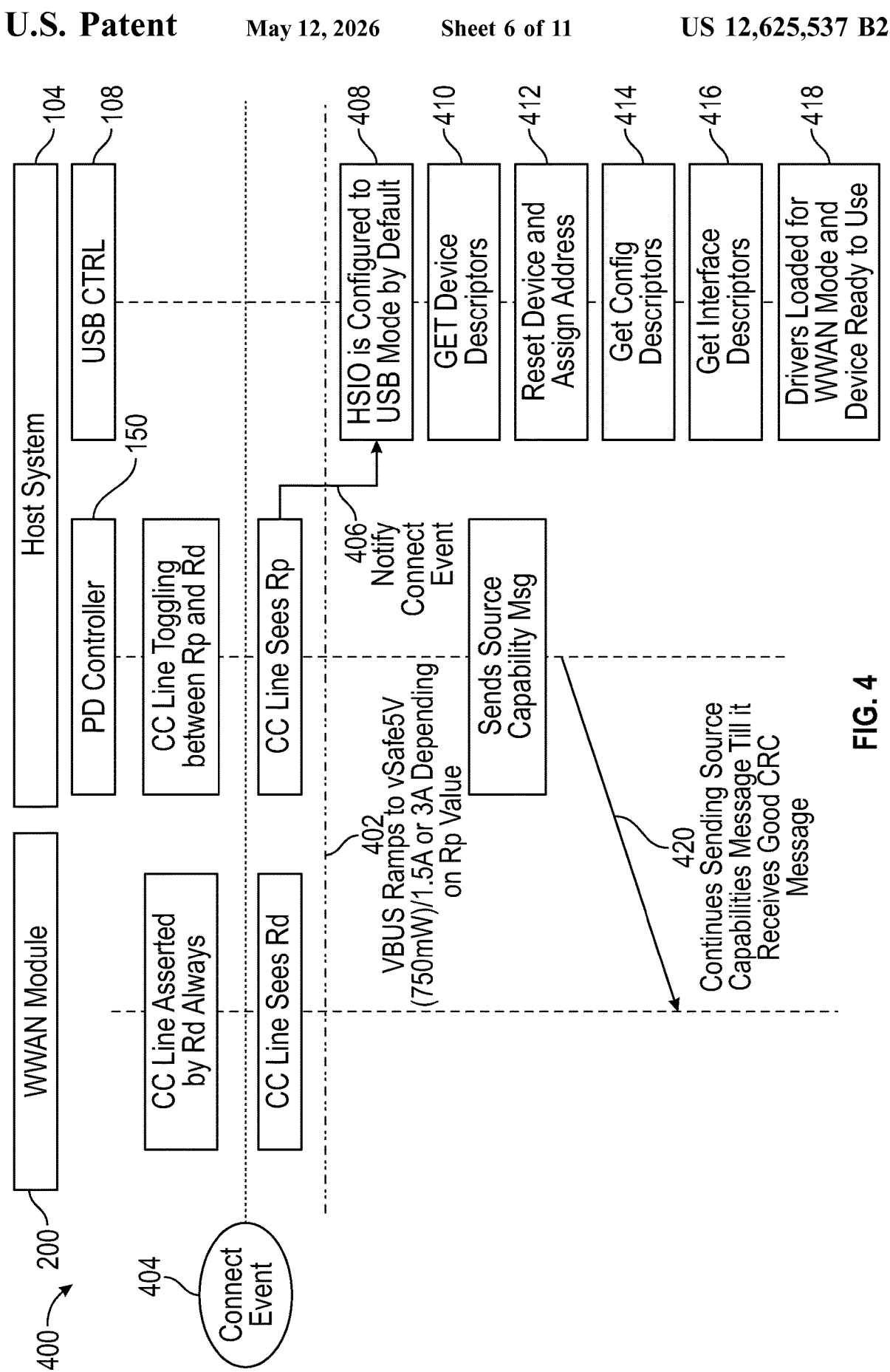
FIG. 4 illustrates a signal diagram for USBC WWAN device identification without a PD controller according to some aspects.

FIG. 4 illustrates a signal diagram 400 for USBC WWAN device identification without a PD controller according to some aspects. As briefly mentioned earlier herein with respect to FIGS. 2A and 2B, power negotiations in apparatus 200 are not performed using a PD controller. Instead, a default USB power of 900 mA or 1.5 A to 3 A will be provided depending on source side capability-Rp pull up value at point 402. Before a connect event at 404, the CC line is asserted by Rd and the PD controller 150 of the host board 104 toggles between Rp and Rd. For example, the USB-C standard has defined parameters as shown in Table 2, which help a host and device to understand power requirements and capability for each other as a default. Any power requirement by a device that is larger than default option it will be further negotiated via CC line by Host PD 150 and Device PD controller.

TABLE 2

| Source CC termination (Rp) requirements. | | | |
|---|---|---|---|
| Source Current Capability | Current Source to 1.7 V-5 V | Rp pull-up to 3.3 V +/− 5% | Rp pull-up to 4.75 V-5.5 V |
| Default USB power | 80 μA +/− 20% | 36 kΩ +/− 20% | 56 kΩ +/− 20% |
| 1.5 A @ 5 V | 180 μA +/− 8% | 12 kΩ +/− 5% | 22 kΩ +/− 5% |
| 3.0 A @ 5 V | 330 μA +/− 8% | 4.7 kΩ +/− 5% | 10 kΩ +/− 5% |

Subsequent to the connect event 404, the PD controller 150 of the host board 104 notifies of a connect event at signal 406. This configures the USB-C connection circuitry 108 of the host board 104 to configure to USB mode according to a standard of the USB family of standards, in blocks 408, 410, 412, 414, 416, and 418. The host board 104 provides source capability messages to the apparatus 200 at signal 420.

Figures 5, 6:
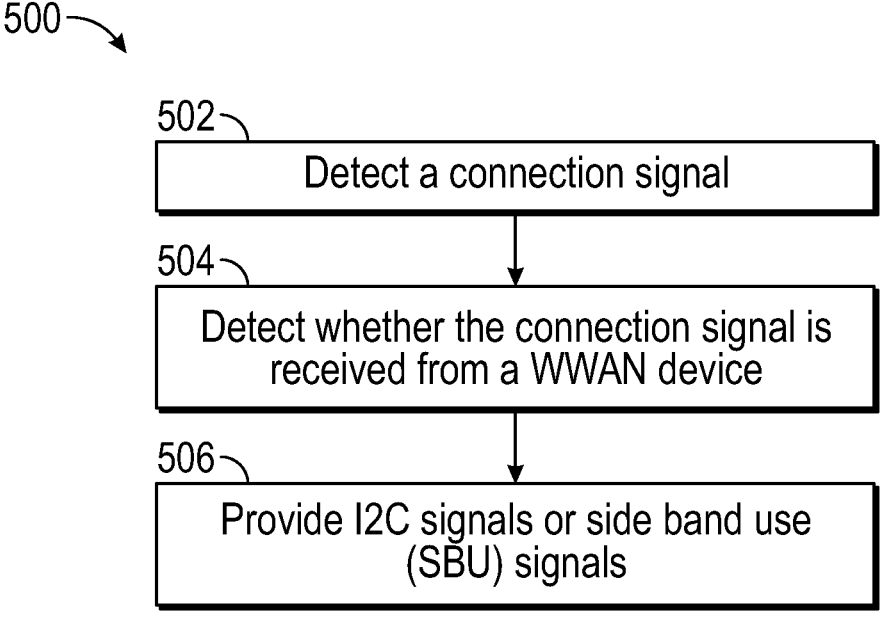
FIG. 5 illustrates a method for connection of a USBC dongle according to some aspects.
FIG. 6 illustrates a method for initiating WWAN communication with a USBC WWAN dongle according to some aspects.

FIG. 5 illustrates a method 500 for connection of a USB-C dongle according to some aspects. The method 500 can be performed by a host board 104, portions of computing systems described below with respect to FIGS. 8A and 8B, or other computing apparatuses that can include USB-C connection ports.

The method 500 can begin with operation 502 with detecting a connection signal at USB-C connection circuitry 108. The method 500 can continue with operation 504 detecting whether the connection signal is received from a WWAN device. The Host will know whether an attached device is a USB storage device or a USB-C WWAN module by existence of or communication by PD to PD controller or by a USB descriptor that contain the information of baseband chip. The method 500 can continue with operation 506 with providing I2C signals to the USB-C connection circuitry 108 if the connection signal is received from a WWAN device, otherwise provide side band use (SBU) signals. In some examples, functions of operation 506 can be performed in conjunction with switch 152. Signals can be passed back and forth to SoC 160.

FIG. 6 illustrates a method for initiating WWAN communication with a USBC WWAN dongle according to some aspects. The method 600 can be performed by apparatus 100 or apparatus 200 (e.g., dongles) as described earlier herein with respect to FIGS. 1-4, or by portions of computing systems described below with respect to FIGS. 8A and 8B, or other computing apparatuses that can include USB-C connection ports.

The method 600 can begin with operation 602 with detecting a connection event at USB-C connection circuitry 106. The method 600 can continue with operation 604 with receiving a wake signal over the USB-C connection circuitry 106. In examples, the wake signal can be provided to baseband circuitry 114 by I/O circuitry 110, although aspects are not limited thereto.

The method 600 can continue with operation 606 with initiating WWAN communication responsive to receiving the wake signal. The WWAN communication can include messages received from the USB-C connection circuitry 106 (e.g., messages received over lines 118). The method 600 can further include performing power negotiations responsive to a detecting the connection event as described with respect to FIG. 3. For example, power negotiations can include receiving a power capabilities advertisement signal (at signal 304 (FIG. 3) for example) and requesting power profile information responsive to receiving the power capabilities advertisement signal (e.g., signal 302 (FIG. 3). In examples, the method 600 can include providing an instruction to enter a standby mode responsive to receiving the requested power profile information and providing an instruction to exit the standby mode responsive to sensing a negotiated power level at the USB-C connection circuitry.

Figure 7:
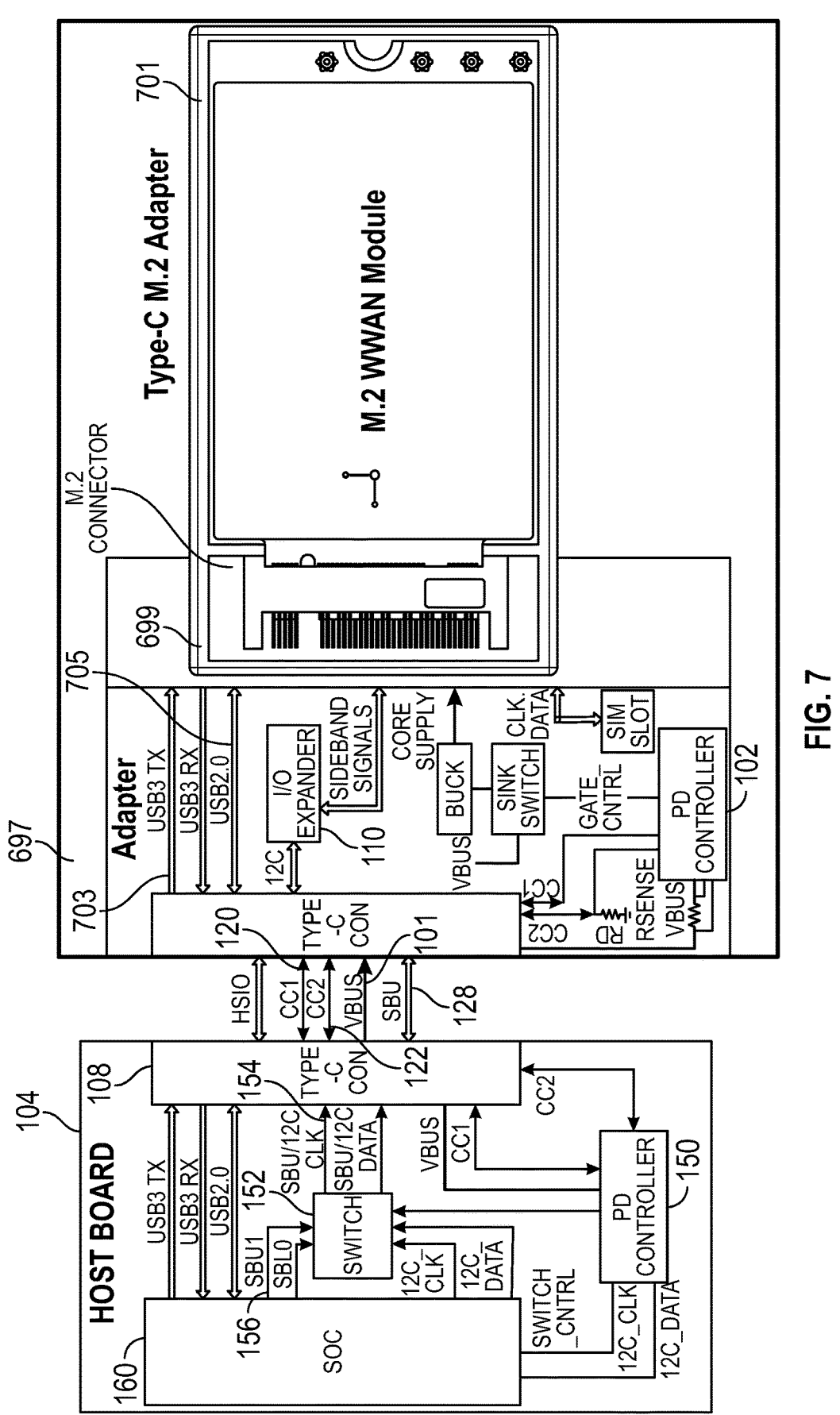
FIG. 7 illustrates an external M.2 WWAN dongle according to some aspects.

FIG. 7 illustrates an external M.2 WWAN adapter 701 according to some aspects. A USB-C adapter 697 is include that connects to an M.2 connector 699 and from there to M.2 adapter 701 for providing M.2 features and services. Signals 703 and 705 provide USB communications from the host board 104 to the M.2 adapter 701. In other respects, similarly-numbered features correspond to features of FIGS. 1A and 1B.

Any of the computing devices discussed with reference to the present systems, environments and devices may be fulfilled based on the components depicted in FIGS. 8A and 8B. Respective computing devices may be embodied as a type of device, appliance, computer, or other "thing" capable of communicating with other edge, networking, or endpoint components. For example, a computing device may be embodied as a personal computer, server, smartphone, a mobile compute device, a smart appliance, an in-vehicle compute system (e.g., a navigation system), a self-contained device having an outer case, shell, etc., or other device or system capable of performing the described functions. For example, a computing device can comprise some or part of a host board 104, or apparatuses 100, 200 (FIGS. 1A and 1B and FIGS. 2A and 2B).

Figure 8A:
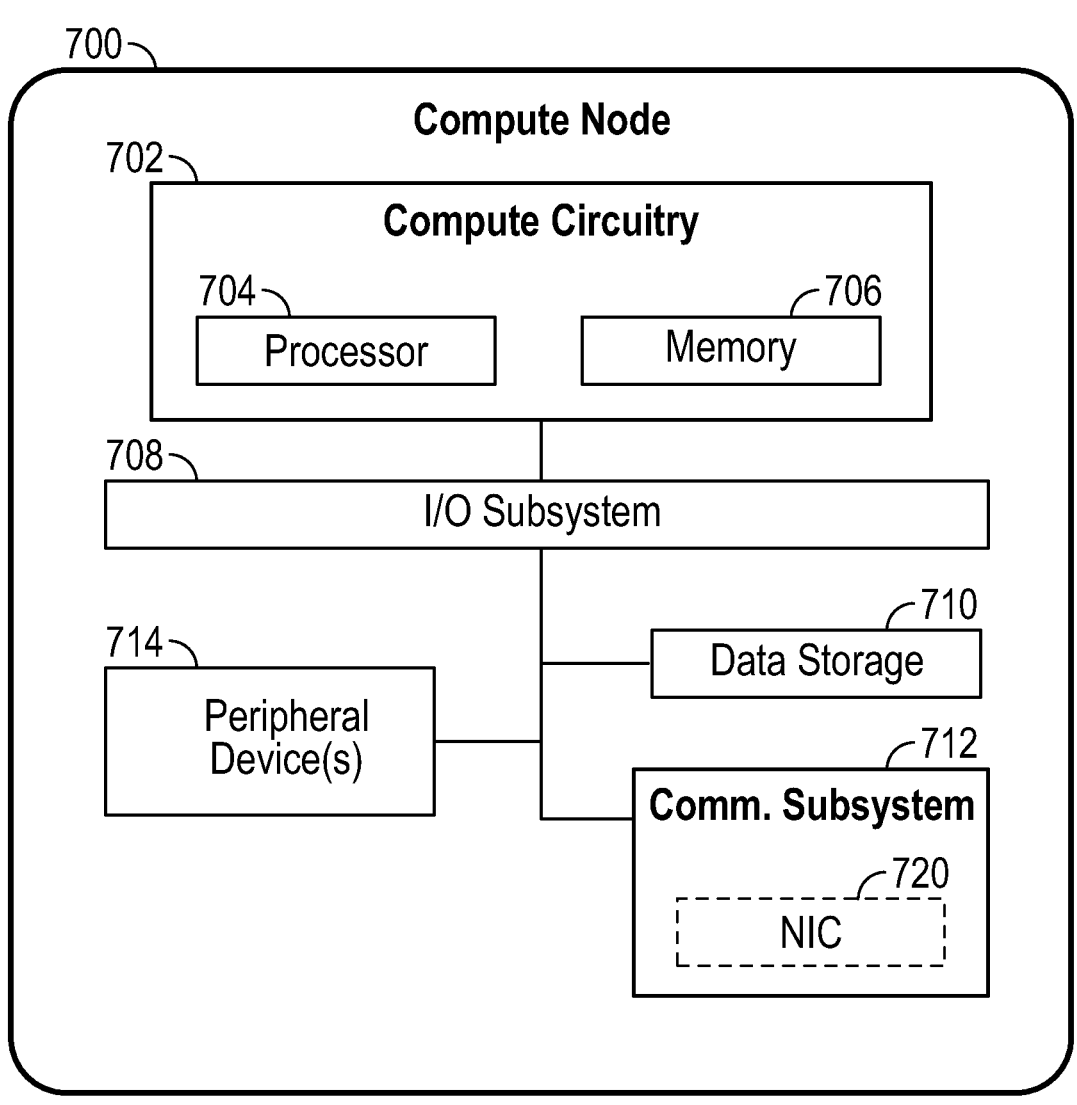
FIG. 8A provides an overview of example components for a computer that can connect to apparatuses according to some aspects.

In the simplified example depicted in FIG. 8A, computing device 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The computing device 700 may be embodied as any type of engine, device, or collection of devices capable of performing various compute functions. In some examples, the computing device 700 may be embodied as a single device such as an integrated circuit, an embedded system, a field-programmable gate array (FPGA), a system-on-a-chip (SOC), or other integrated system or device. In the illustrative example, the computing device 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, or other processor or processing/controlling circuit. In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the computing device 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of computing device 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the computing device 700 to connect with another compute device (e.g., an edge gateway node). In some examples, the NIC 720 may be embodied as part of a system-on-a-chip (SoC) that includes one or more processors or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective computing device 700 may include one or more peripheral devices 714. Such peripheral devices 714 may include any type of peripheral device found in a compute device or server such as audio input devices, a display, other input/output devices, interface devices, and/or other peripheral devices, depending on the particular type of the computing device 700. In further examples, the computing device 700 may be embodied by a respective edge compute node (whether a client, gateway, or aggregation node) in an edge computing system or like forms of appliances, computers, subsystems, circuitry, or other components.

Figure 8B:
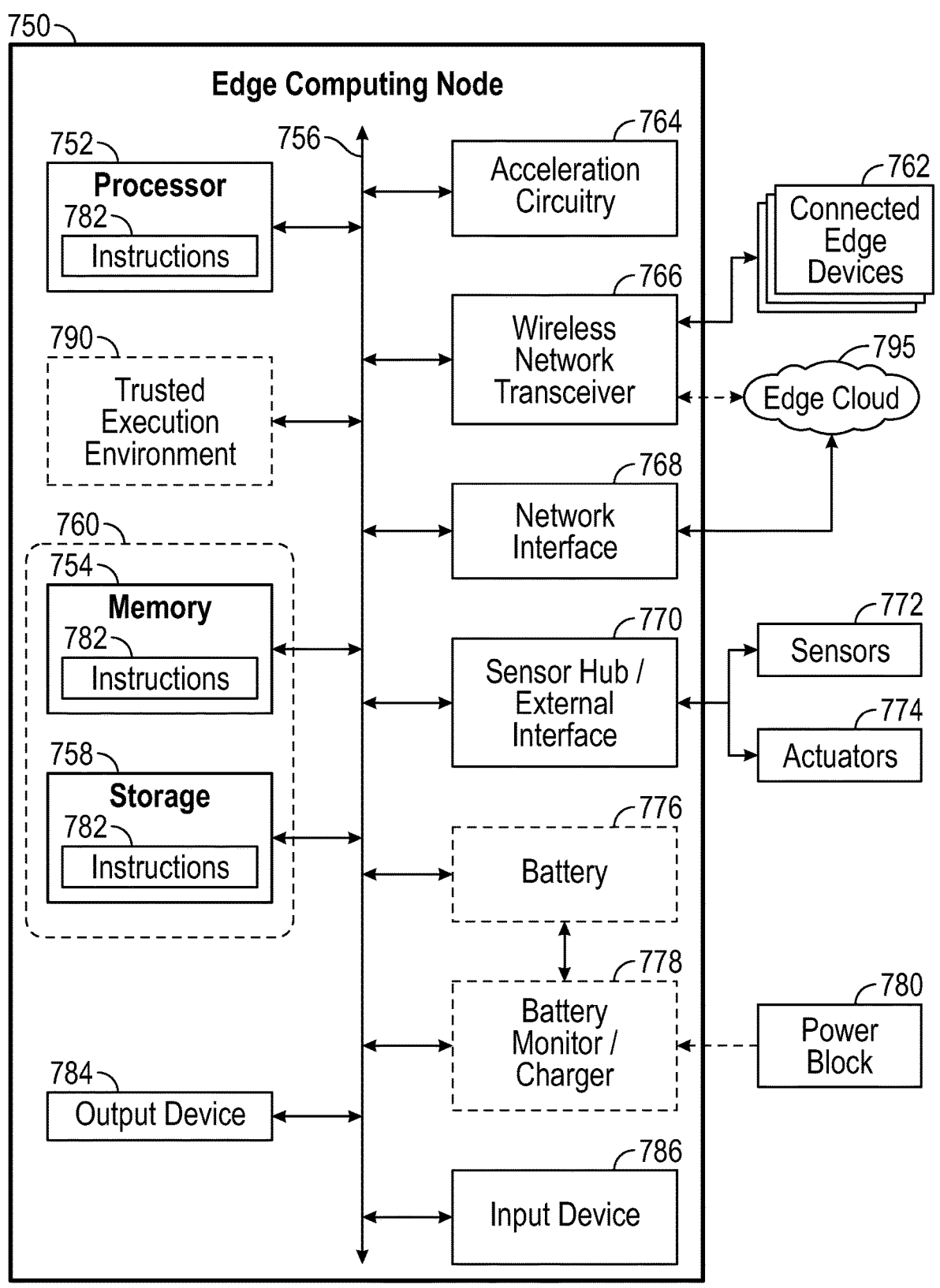
FIG. 8B provides a further overview of example components within a computing device according to some aspects.

In a more detailed example, FIG. 8B illustrates a block diagram of an example of components that may be present in a computing device 750 for implementing the techniques (e.g., operations, processes, methods, and methodologies) described herein. This computing device 750 provides a closer view of the respective components of computing device 700 when implemented as or as part of a computing device (e.g., as a mobile device, a base station, server, gateway, etc.). The computing device 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing device 750, or as components otherwise incorporated within a chassis of a larger system.

The computing device 750 may include processing circuitry in the form of a processor 752, which may be a microprocessor, a multi-core processor, a multithreaded processor, an ultra-low voltage processor, an embedded processor, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 8B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4 A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the computing device 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The computing device 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The computing device 750 may include or be coupled to acceleration circuitry 764, which may be embodied by one or more artificial intelligence (AI) accelerators, a neural compute stick, neuromorphic hardware, an FPGA, an arrangement of GPUs, an arrangement of data processing units (DPUs) or Infrastructure Processing Units (IPUs), one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the computing device 750 to actuators 774, such as power switches, valve actuators, an audible sound generator, a visual warning device, and the like.

In some optional examples, various input/output (I/O) devices may be present within or connected to, the computing device 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing device 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the computing device 750, although, in examples in which the computing device 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the computing device 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488 A from ON Semiconductor of Phoenix Arizona, or an IC from the UCD90xxx family from Texas Instruments of Dallas, TX. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the computing device 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the computing device 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the computing device 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the computing device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Figure 9A:
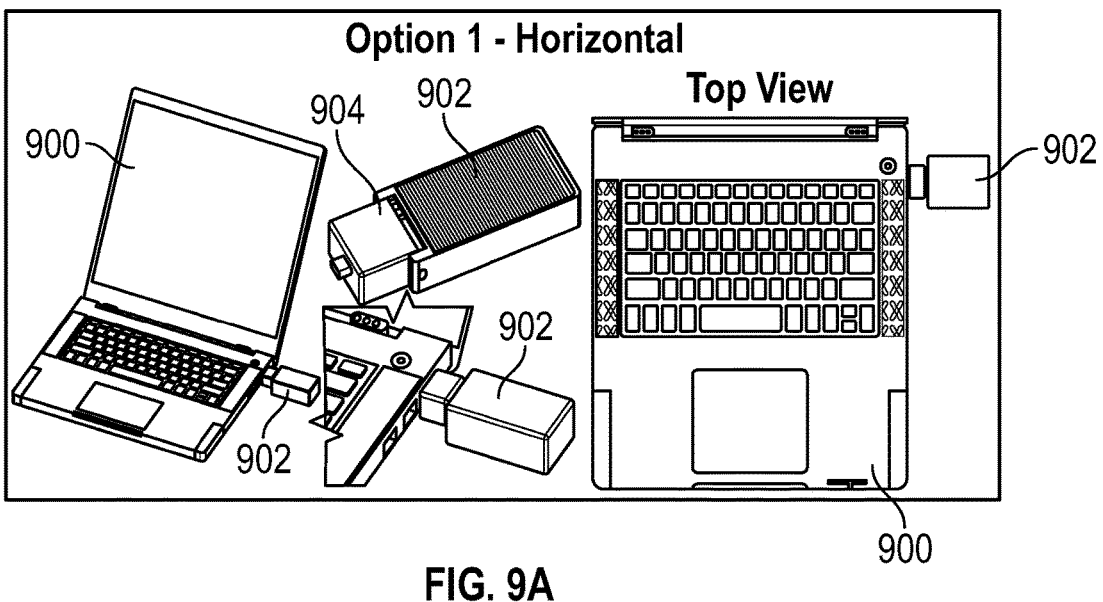
FIG. 9A illustrates a horizontal WWAN dongle according to some aspects.

FIG. 9A illustrates a horizontal WWAN dongle 902 according to some aspects. Laptop 900 can include a USB-C port having connected thereto USB-C connector 904 with WWAN dongle 902. While a laptop 900 is shown, any device having a USB-C port can have WWAN dongle 902 attached thereto, including desktop computers, etc.

Figure 9B:
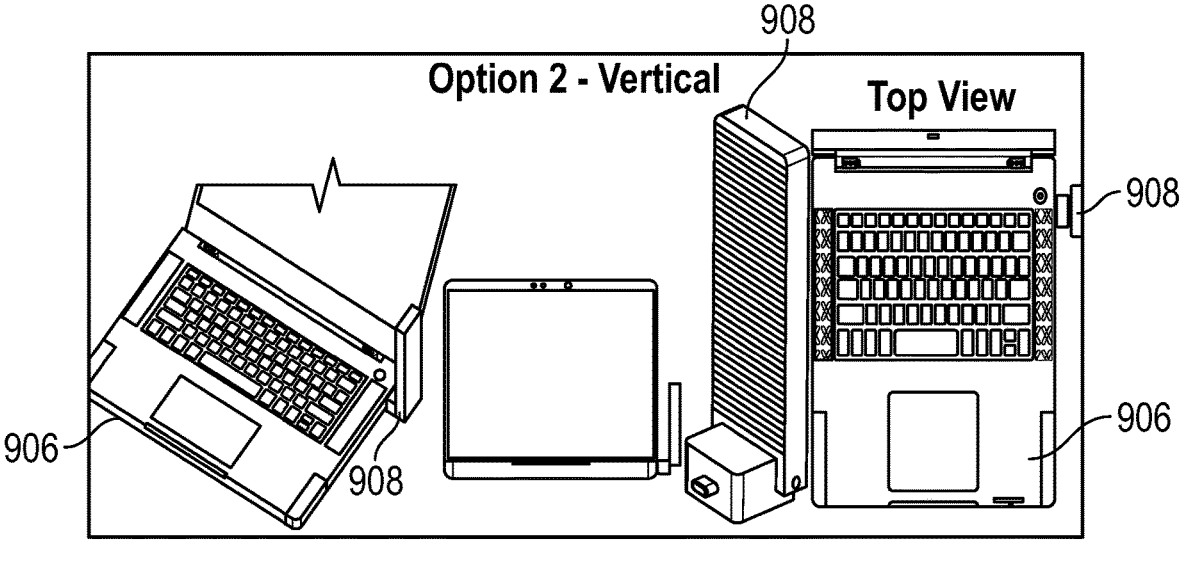
FIG. 9B illustrates a vertical WWAN dongle according to some aspects.

FIG. 9B illustrates a vertical WWAN dongle according to some aspects. Laptop 906 can include a USB-C port having connected thereto USB-C connector with WWAN dongle 908 coupled thereto. While a laptop 906 is shown, any device having a USB-C port can have WWAN dongle 908 attached thereto, including desktop computers, etc.

ADDITIONAL NOTES AND ASPECTS

Example 1 is an apparatus comprising: Universal Serial Bus Type C (USB-C) connection circuitry; input/output (I/O) circuitry coupled to the USB-C connection circuitry, the I/O circuitry configured to receive a power signal over the USB-C connection circuitry; and baseband circuitry coupled to the USB-C connection circuitry and to the I/O circuitry and configured to initiate wireless wide area network (WWAN) communication responsive to receiving a wake signal from the I/O circuitry, the WWAN communication including messages received from the USB-C connection circuitry.

In Example 2, the subject matter of Example 1 can include wherein the I/O circuitry is configured to perform power negotiations responsive to a connection signal received at source-to-sink connector pins of the apparatus.

In Example 3, the subject matter of Example 2 can include a power device (PD) controller configured to receive signals from the USB-C connection circuitry.

In Example 4, the subject matter of Example 3 can include wherein the PD controller is configured to request power profile information responsive to receiving a power capabilities advertisement signal over the USB-C connection circuitry.

In Example 5, the subject matter of Example 4 can include wherein the PD controller is configured to control the apparatus to enter a standby mode responsive to receiving the requested power profile information, and to exit the standby mode responsive to sensing a negotiated power level at the USB-C connection circuitry.

In Example 6, the subject matter of any of Examples 3-5 can include wherein the signals from the USB-C connection circuitry comprise source-to-sink connector pin signals.

In Example 7, the subject matter of any of Examples 1-6 can include wherein side band use (SBU) pins of the USB-C connection circuitry are configured to perform I2C operations, wherein the I2C operations include configuring the I/O circuitry to support M.2 features.

In Example 8, the subject matter of any of Examples 1-7 can include one or more antennas.

In Example 9, the subject matter of Example 8 can include wherein at least one of the one or more antennas comprises a surface mount device (SMD).

Example 10 is an apparatus comprising Universal Serial Bus Type C (USB-C) connection circuitry, side band use (SBU) pins of the USB-C connection circuitry being configured to perform I2C operations, wherein the I2C operations include configuring the I/O circuitry to support M.2 features; input/output (I/O) circuitry coupled to the USB-C connection circuitry, the I/O circuitry configured to receive a power signal over the USB-C connection circuitry; and baseband circuitry coupled to the USB-C connection circuitry and to the I/O circuitry and configured to initiate wireless wide area network (WWAN) communication responsive to receiving a wake signal from the I/O circuitry, the WWAN communication including messages received from the USB-C connection circuitry.

In Example 11, the subject matter of Example 10 can include source-to-sink connector pins of the apparatus, a first source-to-sink connector pin of the source-to-sink connector pins coupled to a pull-down resistor.

In Example 12, the subject matter of any of Examples 10-11 can include wherein a power level of 900 milliamps (mA), 1.5 amps (A), 3 A or 5 A is provided to the I/O circuitry.

In Example 13, the subject matter of any of Examples 10-12 can include one or more surface mount device (SMD) antennas.

Example 14 is a method comprising detecting a connection signal at Universal Serial Bus Type C (USB-C) connection circuitry; detecting whether the connection signal is received from a wireless wide area network (WWAN) device; and providing I2C signals to the USB-C connection circuitry if the connection signal is received from a WWAN device, otherwise provide side band use (SBU) signals.

In Example 15, the subject matter of Example 14 can include loading WWAN device drivers responsive to determining that the connection signal is from a WWAN device.

In Example 16, the subject matter of any of Examples 14-15 can include performing power negotiations responsive to a detecting the connection signal.

Example 17 is a method comprising detecting a connection event at Universal Serial Bus Type C (USB-C) connection circuitry; receiving a wake signal over the USB-C connection circuitry; and initiating wireless wide area network (WWAN) communication responsive to receiving the wake signal, the WWAN communication including messages received from the USB-C connection circuitry.

In Example 18, the subject matter of Example 17 can optionally include performing power negotiations responsive to a detecting the connection event.

In Example 19, the subject matter of Example 18 can optionally include wherein the power negotiations comprise receiving a power capabilities advertisement signal; and requesting power profile information responsive to receiving the power capabilities advertisement signal.

In Example 20, the subject matter of Example 19 can optionally include providing an instruction to enter a standby mode responsive to receiving the requested power profile information; and providing an instruction to exit the standby mode responsive to sensing a negotiated power level at the USB-C connection circuitry.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. An apparatus comprising:
Universal Serial Bus Type C (USB-C) connection circuitry having sideband use (SBU) pins;
input/output (I/O) circuitry coupled to the USB-C connection circuitry, the I/O circuitry configured to receive a power signal over the USB-C connection circuitry;

a power delivery (PD) controller coupled to the USB-C connection circuitry and to the I/O circuitry, the PD controller configured to assert a wake signal to baseband circuitry after reception of a PD power-source-ready message (PS_RDY) and to inhibit baseband wake while the apparatus is in USB-PD Sink Standby, the PD controller to control the apparatus to enter a standby mode responsive to receiving power profile information over the USB-C connection circuitry, and to exit the standby mode responsive to sensing a negotiated power level at the USB-C connection circuitry; and
baseband circuitry coupled to the USB-C connection circuitry and to the I/O circuitry and configured to initiate wireless wide area network (WWAN) communication responsive to receiving the wake signal, the WWAN communication including messages received from the USB-C connection circuitry, the SBU pins repurposed to perform I2C operations after the baseband circuitry boots, and the I2C operations include configuring the I/O circuitry to support M.2 features comprising at least one of Wake on WWAN, service aggregation router (SAR) functions, or module power control.

2. The apparatus of claim 1, wherein the I/O circuitry is configured to perform power negotiations responsive to a connection signal received at source-to-sink connector pins of the apparatus.

3. The apparatus of claim 1, wherein the PD controller is configured to request power profile information responsive to receiving a power capabilities advertisement signal over the USB-C connection circuitry.

4. The apparatus of claim 1, wherein the signals from the USB-C connection circuitry comprise source-to-sink connector pin signals.

5. The apparatus of claim 1, further comprising one or more antennas, wherein the one or more antennas comprise printed antennas on a radio front end (RFE) circuit board.

6. The apparatus of claim 5, wherein at least one of the one or more antennas comprises a surface mount device (SMD).

7. An apparatus comprising:
Universal Serial Bus Type C (USB-C) connection circuitry comprising sideband use (SBU) pins;
input/output (I/O) circuitry coupled to the USB-C connection circuitry, the I/O circuitry configured to receive a power signal over the USB-C connection circuitry;
a power delivery (PD) controller coupled to the USB-C connection circuitry and to the I/O circuitry, the PD controller configured to assert a wake signal to baseband circuitry after reception of a PD power-source-ready message (PS_RDY) and to inhibit baseband wake while the apparatus is in USB-PD Sink Standby, the PD controller to control the apparatus to enter a standby mode responsive to receiving power profile information over the USB-C connection circuitry, and to exit the standby mode responsive to sensing a negotiated power level at the USB-C connection circuitry; and
baseband circuitry coupled to the USB-C connection circuitry and to the I/O circuitry and configured to initiate wireless wide area network (WWAN) communication responsive to receiving the wake signal, the WWAN communication including messages received from the USB-C connection circuitry, the SBU pins repurposed to perform I2C operations after the baseband circuitry boots.

8. The apparatus of claim 7, further comprising source-to-sink connector pins of the apparatus, a first source-to-sink connector pin of the source-to-sink connector pins coupled to a pull-down resistor.

9. The apparatus of claim 7, wherein a current level of 900 milliamps (mA), 1.5 amps (A), 3 A, or 5 A is provided to the I/O circuitry.

10. The apparatus of claim 7, further comprising one or more surface mount device (SMD) antennas.

11. A method comprising:

detecting, by at least one processing circuitry, a connection signal at Universal Serial Bus Type C (USB-C) connection circuitry;

receiving power profile information and a PD power-source-ready message (PS_RDY) over the USB-C connection circuitry;

controlling entry into a standby mode of operation responsive to receiving the power profile information, and exit from the standby mode of operation responsive to sensing a negotiated power level at the USB-C connection circuitry;

asserting a wake signal to baseband circuitry after reception of the PS_RDY;

inhibiting baseband wake while the at least one processing circuitry is in USB-PD Sink Standby;

detecting whether the connection signal is received from a wireless wide area network (WWAN) device; and providing I2C signals to the USB-C connection circuitry over sideband use (SBU) pins after the baseband circuitry boots, if the connection signal is received from a WWAN device, otherwise providing sideband use (SBU) signals.

12. The method of claim 11, further comprising loading WWAN device drivers responsive to determining that the connection signal is from a WWAN device.

13. The method of claim 11, further comprising performing power negotiations responsive to the detecting of the connection signal.

14. A method comprising:

detecting, by at least one processing circuitry, a connection event at Universal Serial Bus Type C (USB-C) connection circuitry;

controlling entry into a standby mode of operation responsive to receiving power profile information over the USB-C connection circuitry, and exit from the standby mode of operation responsive to sensing a negotiated power level at the USB-C connection circuitry;

receiving a PD power-source-ready message (PS_RDY): asserting a wake signal to baseband circuitry after reception of the PD power-source-ready message (PS_RDY);

inhibiting baseband wake while the at least one processing circuitry is in USB-PD Sink Standby;

receiving a wake signal over the USB-C connection circuitry; and initiating wireless wide area network (WWAN) communication responsive to receiving the wake signal, the WWAN communication including messages received from the USB-C connection circuitry, with sideband use (SBU) pins repurposed to perform I2C operations after baseband circuitry boots to configure support of M.2 features comprising at least one of Wake on WWAN, service aggregation router (SAR) functions, or module power control.

15. The method of claim 14, further comprising performing power negotiations responsive to the detecting of the connection event.

16. The method of claim 15, wherein the power negotiations comprise:

receiving a power capabilities advertisement signal; and requesting power profile information responsive to receiving the power capabilities advertisement signal.

17. The method of claim 16, further comprising:

providing an instruction to enter a standby mode responsive to receiving the requested power profile information; and providing an instruction to exit the standby mode responsive to sensing a negotiated power level at the USB-C connection circuitry.

* * * * *